United States Patent

[11] 3,629,634

| [72] | Inventors | Gene L. Dafler<br>New Lebanon;<br>Wayne V. Fannin, Dayton, both of Ohio |
|---|---|---|
| [21] | Appl. No. | 52,559 |
| [22] | Filed | July 6, 1970 |
| [45] | Patented | Dec. 21, 1971 |
| [73] | Assignee | General Motors Corporation<br>Detroit, Mich. |

[54] CONDUIT ARRANGEMENT FOR A LIQUID-COOLED DYNAMOELECTRIC MACHINE
3 Claims, 2 Drawing Figs.

[52] U.S. Cl. .................................................. 310/54, 310/59
[51] Int. Cl. .................................................. H02k 9/00
[50] Field of Search .......................................... 310/54, 52, 58, 59, 60, 64, 61, 90

[56] References Cited
UNITED STATES PATENTS

| 2,894,155 | 7/1959 | Labastie | 310/59 |
| 3,439,201 | 4/1969 | Levy | 310/61 |
| 3,480,810 | 11/1969 | Potter | 310/61 |
| 3,306,074 | 2/1967 | Wilson | 310/64 |
| 3,393,333 | 7/1968 | Kudlacik | 310/61 |
| 3,261,295 | 7/1966 | White | 310/54 |

Primary Examiner—J. D. Miller
Assistant Examiner—R. Skudy
Attorneys—E. W. Christen, C. R. Meland and Robert W. Smith ABSTRACT: A conduit arrangement is described for conducting a liquid coolant between stationary and rotating parts of a liquid-cooled dynamoelectric machine. One conduit end is rotatably mounted in a self-aligning bearing supported in the stationary part and the other end is mounted for universal movement within the passage opening of the rotating part. The conduit is rotated by a pin extending into the passage of the rotating part.

PATENTED DEC 21 1971

3,629,634

INVENTORS
Gene L. Dafler, &
BY  Wayne V. Fannin
Robert W. Smith
ATTORNEY

CONDUIT ARRANGEMENT FOR A LIQUID-COOLED DYNAMOELECTRIC MACHINE

This invention relates generally to dynamoelectric machines having cooling systems and more particularly to a self-adjusting tubular conduit for connecting the passages of rotating and stationary parts of a liquid-cooled dynamoelectric machine.

In systems for cooling large dynamoelectric machines, heat developed in the rotor parts is often transferred to a cooling medium circulated through passages provided in the rotor shaft. When liquid cooling is employed, liquid coolant flow is directed from a stationary inlet through a conduit arrangement to a cooling passage extending axially through the rotor. Heretofore, pipe or tube conduit arrangements have been used to connect the stationary and rotating parts of the machine in which expensive machining is required to provide close tolerances in mating the conduit arrangements with the parts. Rotary seals also employed in these arrangements are subject to wear and failure. A further problem is often encountered in maintaining the openings of the inlet and rotor passages in coaxial alignment. Considerable manufacturing time is required in installing the conduit arrangements since the axial spacing and alignment between the openings must be carefully controlled.

In accordance with the present invention, a conduit arrangement for a liquid-cooled dynamoelectric machine includes a tubular conduit supported in self-adjusting mountings which provide liquid sealed fluid connections between axially spaced openings of cooling passages provided in stationary and rotating parts of the machine. One of the tubular conduit ends is mounted for rotation in a self-aligning sleeve bearing supported in the opening of a coolant inlet passage formed in the stationary part. The opposite end includes an annular boss having a convex cross section so as to have an enlarged diameter for engaging the opening of a rotor coolant passage provided at the end of the machine shaft. Accordingly, the tubular conduit is mounted for universal movement relative to the passage openings to adjust for differences in coaxial alignment between the center axes of the openings. Limited axial movement of the conduit within the sleeve bearing and the shaft opening permits adjustment to accommodate the spacing between the ends of the passage openings. The conduit is rotated with the shaft by a pin extending into the shaft passage and engaging a slot opening at the end of the conduit.

It is an object of this invention to provide an improved conduit arrangement for conducting a cooling medium in a dynamoelectric machine in which the ends of a tubular conduit are sealingly mounted in both radial and axial self-adjusting relationships relative to openings of passages extending into stationary and rotating parts of the machine.

A further object of this invention is to provide a self-adjusting tubular conduit for conducting a liquid coolant between a stationary and a rotating part of a dynamoelectric machine wherein one end is mounted for self-aligning movement in a sleeve bearing supported in an opening of one of the machine parts and the other end is supported for universal movement in an opening of the other cross section extending around the end of the conduit with the conduit being axially shiftable within the passage openings.

A still further object of this invention is to provide a tubular conduit for a liquid-cooled dynamoelectric machine for connecting the opening of a cavity formed in a stationary part of the machine with an axial bore opening formed at the end of a shaft cooling passage wherein a self-aligning sleeve bearing mounted in the cavity opening rotatably supports one end of the tubular conduit and hydrodynamic pressures generated in a liquid film formed between the conduit and the bearing provides sealing of the cavity opening and the other conduit end includes an annular boss which supports a shaft seal for sealingly engaging the axial bore opening, and further wherein the tubular conduit is rotated with the shaft by a pin extending through the axial bore and engaging the sides of a slot formed in the other end of the conduit.

Further objects and advantages of the present invention will be apparent from the following description, reference being had to the accompanying drawing wherein a preferred embodiment of the present invention is clearly shown.

Figure 1:
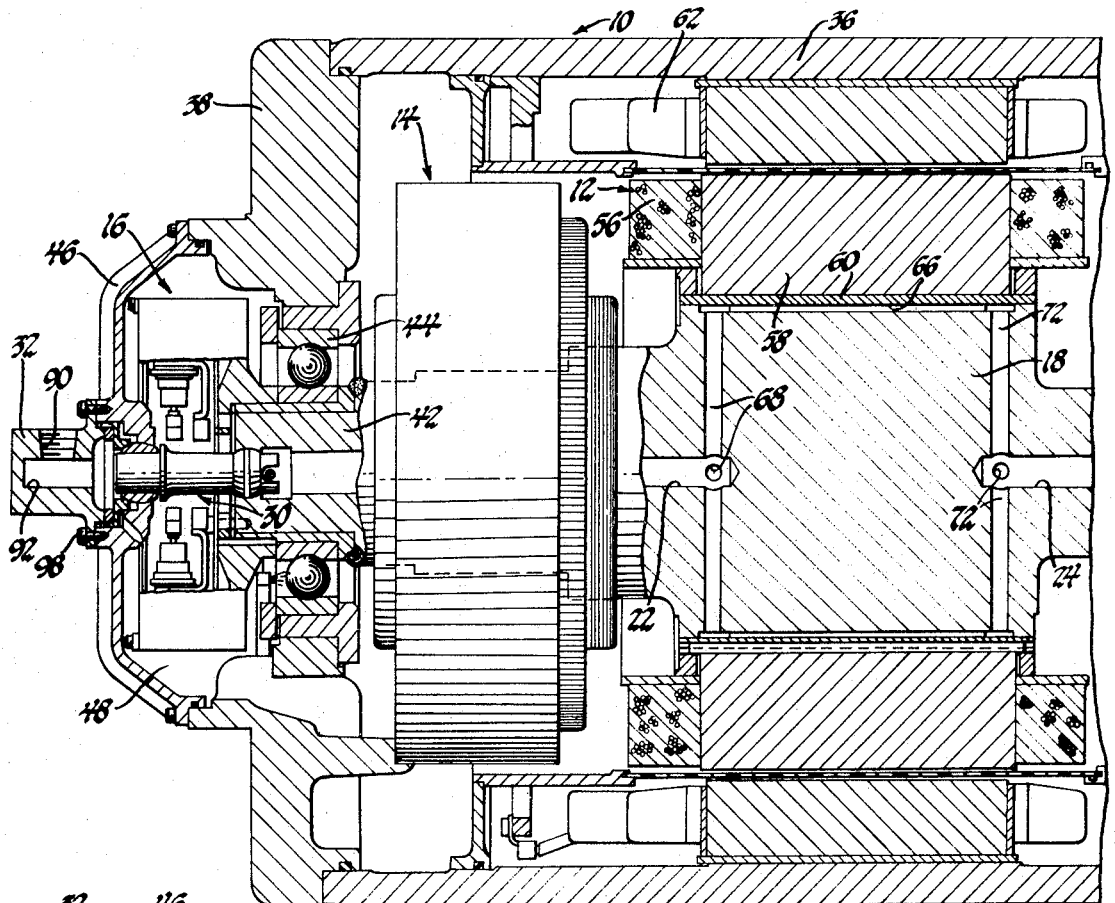
FIG. 1 illustrates a cross-sectional side view of a liquid-cooled dynamoelectric machine including a conduit arrangement made in accordance with the present invention.

Referring now to the drawing, a liquid-cooled dynamoelectric machine 10 of the brushless alternating current generator type is illustrated in FIG. 1 for purposes of describing the present invention. The main electrical sections of the machine 10 include a main generator 12, an exciter generator 14 and an integral rectifier assembly 16. The rotor assemblies of the main and exciter generators 12 and 14 are mounted on a rotatable shaft 18 so as to electrodynamically react with associated stator assemblies. Heat developed in the rotor assemblies is transferred from the machine 10 by a liquid cooling system which circulates a liquid coolant such as oil through the shaft 18.

A pair of substantially cylindrical axial bores 22 and 24 extending from opposite ends of the shaft 18 form entering and exiting cooling passages of the rotor cooling system. A conduit arrangement including a tubular conduit 30, forming a principal feature of the present invention and described in detail hereinbelow, conducts a liquid coolant from a coolant inlet cap 32 to the end opening 34 of the axial bore 22.

A liquidtight housing for the dynamoelectric machine 10 is provided by an annular frame 36 including an end frame section 38 illustrated at the left-hand end of FIG. 1. The right-hand portions of the frame 36 and the shaft 18 have been removed from FIG. 1 in order to simplify the drawing. A center opening in the end frame section 38 supports a bearing 44 wherein the shaft end 42, having a reduced diameter is journaled for rotation. A housing end cover 46 is mounted on the center of the end frame section 38 so as to form a chamber 48 therebetween. The rectifier assembly 16 is mounted on the end of the shaft end 42 and is rotated within the chamber 48. The coolant inlet cap 32, noted hereinabove, is mounted over a center opening 50 of the end cover 46.

The main generator 12, exciter generator 14 and rectifier assembly 16 are connected in an electrical circuit as described more fully in copending application, Ser. No. 52,556 for a Cooling Arrangement for a Dynamoelectric Machine filed concurrently with this application and assigned to the assignee of this invention. In operation of the electrical circuit of the dynamoelectric machine 10, heat is developed by the rotor assemblies mounted on the shaft 18. For example, heat is generated by current flow in the main generator field winding 56 carried by a rotor core 58 which is mounted to the shaft 18 by a cylindrical sleeve 60. The heat is developed by current flow in the field winding 56 as electrical power is generated in the main generator output winding 62 when the shaft 18 is rotated, in a manner well known to those skilled in the art of dynamoelectric machines.

To transfer heat from the rotor core 58 to a liquid coolant, a series of axial passages 66 extend between the ends of the cylindrical sleeve 60 on the outer diameter of the shaft 18. The opposite ends of the axial passages 66 communicate with first and second sets of four radial cooling passages designated by numerals 68 and 72 which extend to the inner ends of the axial bores 22 and 24, respectively. Accordingly, heat developed in the winding 56 is transferred to the rotor core 58 through the cylindrical sleeve 60 to liquid coolant circulated through the axial passages 66.

In order to circulate a liquid coolant through the cooling passages of the shaft 18, described hereinabove, the cooling system directs the liquid coolant from the inlet cap 32 through the tubular conduit 30, which is described in detail hereinbelow, and to the axial bore 22 and the radial passages 68. The liquid coolant flows through the axial passages 66 to the radial passages 72 and the axial bore 24. The liquid coolant is then discharged from the end of the shaft to a reservoir, not shown, connected with an external heat exchange and circulating arrangement also connected with the inlet cap 32.

Figure 2:
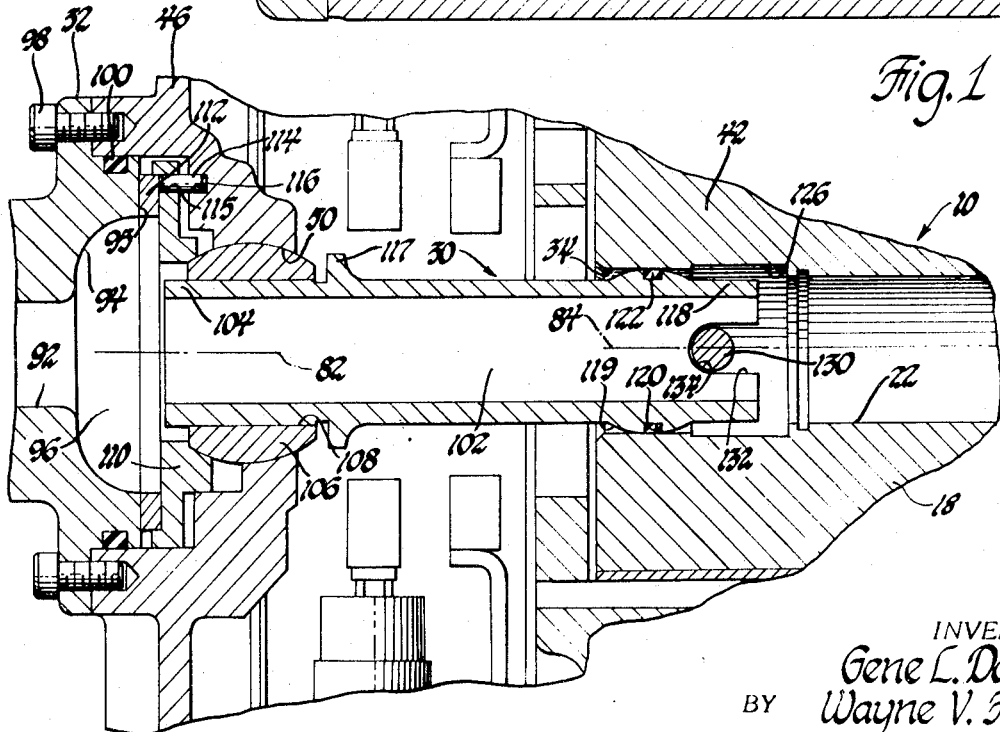
FIG. 2 is an enlarged view of a portion of FIG. 1.

Referring now to FIG. 2, the tubular conduit 30 is illustrated in an enlarged cross-sectional view thereof as it is disposed between the inlet cap 32 and the end opening 34 of the shaft axial bore 22. The tubular conduit 30 is provided with self-adjusting mounting arrangements at both ends thereof so as to be self-adjusting relative to the center axis 82 of the end cover opening 50 which communicates with the inlet cap 32 and the center axis 84 of the bore opening 34. The center axis 84 is coincident with the axis of rotation of the shaft 18. Provision is also made for the tubular conduit 30 to be axially shiftable in accordance with the description hereinbelow.

The inlet coolant cap 32 includes an external opening 90 for connection to a supply of liquid coolant, not shown. The opening 90 extends radially to an axial passage 92 terminating at one end within the inlet cap 32 and at the other end at a counterbored portion 94 which provides an enlarged passage opening at the inner end 95 of the inlet cap. A cavity 96 is formed within the opening 94 which communicates with the end cover opening 50. The inlet cap 32 is mounted on the end cover 46 by screws 98 with an O-ring seal 100 mounted therebetween.

Referring now more particularly to the tubular conduit 30, the conduit has a generally hollow cylindrical shape and is made of a suitable metal material such as steel. A conduit passage 102 is provided therein for conducting liquid coolant between the inlet cap 32 and the shaft bore opening 34. One end section 104 of the tubular conduit 30 is mounted for self-aligning movement within the opening 50 by a sleeve bearing 106 made of a sintered bronze bearing material. The outer surface of the sleeve bearing 106 has a convex spherical contour which is supported in a complementary shaped concave spherical seat formed around the opening 50. The inner bearing surface 108 of the sleeve bearing 106 rotationally supports the cooperative bearing surface provided by end section 104. A retaining ring 110 is clamped against the sleeve bearing 106 by an annular washer 112 which is forced against the retaining ring 110 by the end 95 of the inlet cap 32. An alignment pin 114 extends between aligned hole openings 115 and 116 of the retaining ring 114 and end cover 46, respectively.

A tight rotational fit is provided between the sleeve bearing surface 108 and the end section 104 of the tubular conduit 30 with a thin film of liquid coolant being provided therebetween. Liquid coolant from the cavity 96 is deposited between the bearing surface 108 of the bearing 106 and the end section 104 by hydrodynamic forces acting on the liquid film disposed therebetween when the conduit rotates. The hydrodynamic pressures in the liquid film provide an effective seal for preventing any substantial discharge of liquid coolant from the cavity 96.

An annular flange 117 on the outer surface of the tubular conduit 30 terminates the inner axial portion of the end section 104. The annular flange 117 forms a stop member for restraining axial movement of the tubular conduit 30 through the sleeve bearing 106 and toward the cavity 96.

The opening 34 of the axial bore 22 receives the other end section 118 of the tubular conduit 30 so that it is mounted therein for universal movement relative to the axial bore 22. An annular boss 119 at the inner axial portion of the end section 118 is provided with a convex spherical outer surface. An annular groove 120 extending around the center of the boss 119 supports an O-ring shaft seal 122. The O-ring seal 122 extends slightly above the annular boss 119 so as to resiliently engage the sides of the opening 34. Sealing engagement is provided between the O-ring seal 122 and the opening 34 when the end section 118 of the tubular conduit 30 is mounted within the bore 22. An enlarged diameter bore section 126 between the opening 34 and the interior of the bore 22 permits the end section 118 to be inclined relative to the center axis 84 of the opening 34.

The tubular conduit 30 is rotated with the shaft 18 by a cylindrical pin 130 extending transversely through the shaft 18 and the center axis of the bore section 126. A pair of diametrically disposed slots 132 extend axially into the conduit end section 118 having substantially parallel opposing slot sides spaced so as to engage either side of the pin 130. As the shaft 18 is rotated, the pin 130 rotates the tubular conduit 30 within the sleeve bearing 106. The closed ends 134 of the slots 132 are spaced from the terminal end of the end section 118 to engage the pin 130 thereby preventing axial movement of the tubular conduit 30 toward the interior of the axial bore 22.

The tubular conduit 30 is assembled following assembly of the shaft 18 within the annular frame 22 so that the shaft end 42 is mounted for rotation within the inner race of the bearing 44. With the end cover 46 removed, the end section 118 of the tubular conduit 30 is inserted into the annular bore 22 so that the opposing sides of the slots 132 extend over the pin 130. The annular boss 119 and O-ring seal 122 will then be supported by the opening 34 in a substantially liquidtight sealing relationship as noted hereinabove. The end cover 46 is then mounted on the end frame section 38 with the outer end of the tubular conduit extending through the center of opening 50 thereof.

The sleeve bearing 106 is mounted over the end section 104 of the tubular conduit 30 and is seated within the center opening 50 of the end cover 46. The end section 104 is usually prelubricated with the oil used as the liquid coolant prior to insertion into the sleeve bearing 106. Coaxial misalignment between the center axis 82 of the end cover opening 50 and the center axis 84 of the bore opening 34 causes the tubular conduit 30 to be inclined between the openings 34 and 50. For example, if the bore opening 34 is below the center opening 50, the sleeve bearing 106 will be rotated slightly clockwise and the conduit end section 104 will be inclined toward the bottom of the bore section 126. The sleeve bearing 106 is clamped in place by means of the retaining ring 110 which is held in alignment with the bearing 106 by the pin 114 prior to the inlet cap 32 being secured in place by the screws 98. After the washer 112 is mounted against the retaining ring 110, the inlet cap 32 is then secured in place by means of the screws 98 so as to clamp the washer 112 and retaining ring 110 against the sleeve bearing 106.

Accordingly, a coolant flow path is provided from the external opening 90 of the inlet cap 32, through the cavity 96, and into the conduit passage 102 of the tubular conduit 30. The conduit passage 102 extending through the bore opening 34 discharges the coolant into the bore 22.

As the shaft 18 is rotated, the pin 130 engages the opposing sides of the slots 132 so that the tubular conduit 30 is rotated within the sleeve bearing 106. The liquid film between the conduit end section 104 and the bearing surface 108 develops hydrodynamic pressures which produce a seal preventing discharge of coolant from the cavity 96. Small discharge of the liquid coolant which may occur, will be replenished from the liquid coolant which fills the cavity 96 so that the bearing surfaces are maintained lubricated.

The tubular conduit arrangement of this invention has been found to provide satisfactory sealing when used for extended periods of operation. In one preferred embodiment, the diameter of the conduit passage 102 is 0.75 inch and carries liquid coolant at the rate of 6.5 gallons per minute between the inlet cap 32 and the shaft bore 22.

While the embodiment of the present invention as herein disclosed constitutes a preferred form, it is to be understood that other forms might be adopted.

What is claimed is as follows:

1. A liquid-cooled dynamoelectric machine comprising: a housing member carrying a stator assembly and including a cooling passage terminating at an opening exposed to the interior of said housing member; a shaft member carrying a rotor assembly rotatably supported in said housing so that the rotor assembly electrodynamically reacts with said stator assembly; a cooling passage extending axially through said shaft member from an end opening disposed in opposing relationship to said opening of said housing member; a tubular conduit fluidly connected between said openings of said cooling passages for conducting a liquid coolant therebetween; a self-aligning mounting supported by one of said members within one of said openings and adapted for rotatably receiving one end of said conduit; a universally movable mounting included at an opposite end of said conduit and supported within the other of said openings by the other of said members; and means carried by one of said members and engageable by said conduit to restrain rotation of said conduit at the other of said openings; whereby said ends of said conduit are movably mounted so as to be adjustably aligned in an inclined relationship with the center axes of said openings when said axes are coaxially misaligned.

2. A liquid-cooled dynamoelectric machine comprising: a housing member carrying a stator assembly and including a cooling passage terminating at an opening exposed to the interior of said housing member; a shaft member carrying a rotor assembly rotatably supported in said housing so that the rotor assembly electrodynamically reacts with said stator assembly; a cooling passage extending axially through said shaft member terminating at an opening disposed in opposing relationship to said opening of said housing member; a self-aligning sleeve bearing supported by one of said members within one of said openings; a tubular conduit fluidly connected between said openings at said cooling passages for conducting a liquid coolant therebetween; said conduit including one end journaled for rotation in said self-aligning bearing in an axially movable relationship thereto; said conduit further including an opposite end forming an annular boss having a convex spherical surface carrying an annular shaft seal, said annular boss being supported by the other of said members in a sealing relationship within the other of said openings thereby providing a universally movable mounting at the other of said openings; and means carried by said other of said members and engageable by said opposite end of said conduit for restraining relative rotation between said conduit and said other member so that said one end of said conduit rotates in said sleeve bearing when said shaft member is rotated, whereby said ends of said conduit are adjustably mounted so as to be movable in an inclined relationship with respect to the center axes of said openings and axially shiftable between said openings to accommodate coaxial misalignment between said axes.

3. A liquid-cooled dynamoelectric machine comprising: a housing carrying a stator assembly and including a cooling inlet passage having one end adapted for connection to a supply of liquid coolant and an opposite end terminating at an opening to the interior of said housing; a shaft member carrying a rotor assembly rotatably supported in said housing so that the rotor assembly electrodynamically reacts with said stator assembly and including an end spaced from the interior opening of said cooling inlet passage; a rotor cooling passage extending axially in said shaft member from an end opening thereof; a self-aligning sleeve bearing supported in said interior opening of said cooling inlet passage; a tubular conduit fluidly connected and axially adjustable between said cooling passages for conducting a liquid coolant therebetween, one end section of said conduit being insertable through said interior opening of said cooling inlet passage and journaled for rotation in said self-aligning bearing so that a liquid sealing film is formed therebetween when said conduit is rotated and said one end section further including a radially extending flange for limiting movement of said conduit in one axial direction, and an opposite end section of said conduit including an axially extending slot insertable into said rotor cooling passage and an annular boss having a convex spherical surface carrying an annular O-ring seal supported in said end opening of said rotor cooling passage for forming a universally movable mounting therein; and a pin means extending transversally through said shaft and said slot for engaging the sides of said slot to restrain relative rotation between said conduit and said shaft member and for further engaging the end of said slot to limit movement of said conduit in a second axial direction, whereby the ends of said tubular conduit are adjustably mounted so as to be aligned with the center axes of said openings of said cooling passages and are axially shiftable in the axial space between said end of said shaft and said interior opening of said cooling inlet passage.

* * * * *